United States Patent [19]
Koppel

[11] 3,897,518
[45] July 29, 1975

[54] α-(DIBENZYLPHOSPHONO)ACETIC ACIDS
[75] Inventor: Gary A. Koppel, Indianapolis, Ind.
[73] Assignee: Eli Lilly and Company, Indianapolis, Ind.
[22] Filed: Feb. 28, 1974
[21] Appl. No.: 446,868

[52] U.S. Cl. .......... 260/941; 260/514 L; 260/515 R; 260/526 N; 260/968; 260/969; 260/976; 260/983
[51] Int. Cl.$^2$ ...................... C07C 51/00; C07F 9/40
[58] Field of Search .................................... 260/941

[56] References Cited
UNITED STATES PATENTS
3,281,440   10/1966   Machleidt et al. .............. 260/941 X
FOREIGN PATENTS OR APPLICATIONS
877,361   9/1961   United Kingdom ................. 260/941

OTHER PUBLICATIONS

Hanning et al., Chemical Abstracts, Vol. 67 (1967) 73650e.

Isvetkov et al., Chemical Abstracts, Vol. 78 (1973) 135484s.

Primary Examiner—Richard L. Raymond
Attorney, Agent, or Firm—William C. Martens, Jr.; Everet F. Smith

[57]                ABSTRACT

Novel α-(dibenzylphosphono)acetic acids are useful in the direct preparation of α,β-unsaturated carboxylic acids by reaction of the former with an aldehyde or a ketone in the presence of an alkaline reagent.

2 Claims, No Drawings

α-(DIBENZ-YLPHOSPHONO)ACETIC ACIDS

BACKGROUND OF THE INVENTION

A frequently employed method for preparing an α,β-unsaturated compound is a reaction commonly referred to as the Emmons reaction [W. S. Wadsworth and W. D. Emmons, J. Amer. Chem. Soc., 83, 1733 (1961)]. By this reaction a compound of the formula

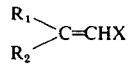

can be prepared by reaction of an aldehyde or a ketone of the formula

with an α-phosphono reagent. In the above formula X is cyano, aryl, or alkoxycarbonyl. The particular α-phosphono reagent which is employed has the structure

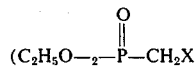

in which X is as aforedescribed.

By means of the Emmons reaction, it is possible to prepare an α,β-unsaturated carboxylic acid, such as, for example, cinnamic acid; however, in order to obtain this product, it has been essential to react the aldehyde or ketone under Emmons reaction conditions with the above α-phosphono reagent in which X is an appropriately selected alkoxycarbonyl function. The resulting product, an α,β-unsaturated ester, must then be hydrolyzed to obtain the desired α,β-unsaturated acid.

It now has been discovered that it is possible to prepare an α,β-unsaturated acid directly and without intermediate ester formation. The product is obtained in excellent yield using Emmons reaction conditions and employing an α-phosphono reagent of specific structure. It is therefore an object of this invention to provide novel α-phosphono reagents which are useful in the direct synthesis of α,β-unsaturated acids.

A further object of this invention is a process for the direct synthesis of α,β-unsaturated acids employing the novel α-phosphono reagents defined herein.

SUMMARY OF THE INVENTION

Broadly, this invention relates to an α-phosphonoacetic acid of the formula

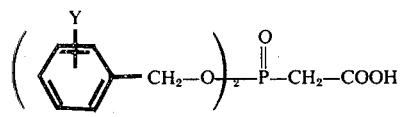

in which Y represents a substituent in the ortho- or paraposition and is selected from the group consisting of hydrogen, methyl, methoxy, halo, and nitro.

In another aspect, this invention is directed to a process for preparing a compound of the formula

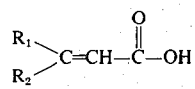

which comprises reacting an aldehyde or a ketone of the formula

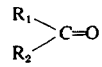

with an α-phosphonoacetic acid of the aforedescribed structure at a temperature of from about −80° C. to about +25° C. in an inert solvent and in the presence of at least two equivalents of an alkaline reagent per equivalent of the α-phosphonoacetic acid, said alkaline reagent being of sufficient alkalinity to generate a dianion form of the α-phosphonoacetic acid, in which, in the above formulae, $R_1$ and $R_2$ independently are hydrogen, $C_1$–$C_4$ alkyl, or phenyl, or $R_1$ and $R_2$ in combination with the carbon atom to which they are attached represent a $C_5$–$C_7$ cycloalkylidene ring.

DETAILED DESCRIPTION OF THE INVENTION

As hereinbefore mentioned, this invention relates in part to a new class of compounds useful in preparing α,β-unsaturated carboxylic acids. The novel compounds of this invention belong to a class of specifically defined α-phosphonoacetic acids.

An α-phosphonoacetic acid has been disclosed in the prior art, specifically α-diethylphosphonoacetic acid [Stork et al., Chemical Communications (1970) pp. 445–446]. The disclosed α-diethylphosphonoacetic acid is not used in dianion formation to prepare an α,β-unsaturated carboxylic acid. Instead, it is first treated with an amine to produce an amide derivative which results in inactivation of the active carboxyl center of the α-diethylphosphonoacetic acid. Only after deactivation by production of the amide intermediate is a monovalent anion generated which then reacts internally to produce a cyclic structure. Thus, dianion formation is not accomplished in the disclosure of this publication. Indeed, the publication itself recognizes the relative instability of α-phosphonoacetic acids since it suggests that they readily decompose by loss of $CO_2$.

This invention is directed to a different class of α-phosphonoacetic acids, the structures of which will permit the direct preparation of α,β-unsaturated acids in good yield, especially when compared with the results available from α-phosphonoacetic acids having structures which are more nearly like those of the prior art.

Illustrative of the α-phosphonoacetic acids of this invention are the following: α-(dibenzylphosphono)acetic acid, α-[di-(o-methylbenzyl)phosphono]acetic acid, α-[di-(p-methylbenzyl) phosphono]acetic acid, α-[di-(o-methoxybenzyl)phosphono]acetic acid, α-[di-(p-methoxybenzyl)phosphono]acetic acid, α-[di-(o-fluorobenzyl)phosphono]acetic acid, α-[di-(p-fluorobenzyl) phosphono]acetic acid, α-[di-(o-chlorobenzyl)phosphono]acetic acid, α-[di-(p-chlorobenzyl)phosphono]acetic acid, α-[di-(o-bromobenzyl)phosphono]acetic acid, α-[di-(p-bromobenzyl)phosphono] acetic acid, α-[di-(o- iodobenzyl)phosphono]acetic acid, α-[di-(p-iodobenzyl)phosphono]acetic acid, α-[di-(o-nitrobenzyl)phosphono] acetic acid, and α-[di-(p-nitrobenzyl)phosphono]acetic acid.

Any of the above phosphonoacetic acids are capable of being employed in accordance with the process of this invention in preparation of the α,β-unsaturated carboxylic acids. However, preferably, the phosphonoacetic acid which is employed is α-(dibenzylphosphono)acetic acid, and this compound also represents the preferred compound of the class of compounds of this invention.

The compounds of this invention can be readily prepared by the following general scheme:

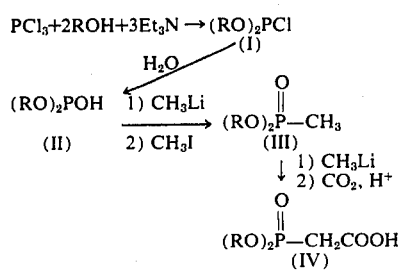

In the foregoing scheme, R represents the benzyl or substituted benzyl function appearing in the α-phosphonoacetic acid compound of this invention. Preparation of the phosphorochloridite (I) from phosphorus trichloride and the alcohol is accomplished in accordance with the procedure disclosed in Glamkowski et al., J. Org. Chem., 35, 3510 (1970).

The phosphorochloridite is sufficiently reactive to be converted to the corresponding dibenzyl or substituted dibenzyl phosphite (II) simply by bringing it into contact with water.

The dibenzyl or substituted dibenzyl phosphite is readily converted to the corresponding methyl dibenzyl phosphonate (III) by treatment of the phosphite with methyllithium at a temperature of from about −80° C. to about +25° C. At least a molar equivalent amount of the methyllithium based on the phosphite is employed. Upon formation of the methyl dibenzyl phosphonate from the phosphite and methyllithium, a highly active lithium hydride by-product forms. The by-product is readily decomposed by addition to the reaction mixture of methyl iodide.

The methyl dibenzyl phosphonate can then be converted to the desired product, the corresponding α-(dibenzylphosphono)-acetic acid. This is accomplished by reacting the methyl dibenzyl phosphonate at a temperature of from about −80° C. to about +25° C. with a further portion of methyllithium to provide an activated intermediate which is then treated with carbon dioxide and acid.

The α-(dibenzylphosphono)acetic acid is recovered by readily recognized techniques, for example, typical extraction procedures employing common organic solvents and customary acid-base techniques.

In accordance with the process aspect of this invention, an α,β-unsaturated carboxylic acid is prepared employing an α-(dibenzylphosphono)acetic acid as one of the reactants. The other reactant plays the principal part in determining the structure of the α,β-unsaturated carboxylic acid final product. This reactant is a carbonyl compound, specifically a ketone or an aldehyde. Typical such aldehydes include formaldehyde, acetaldehyde, propionaldehyde, butyraldehyde, isobutyraldehyde, benzaldehyde, and the like. Typical such ketones include acetone, methyl ethyl ketone, diethyl ketone, methyl propyl ketone, ethyl propyl ketone, methyl butyl ketone, dibutyl ketone, di-n-propyl ketone, diisopropyl ketone, propyl butyl ketone, benzophenone, acetophenone, ethyl phenyl ketone, propyl phenyl ketone, butyl phenyl ketone, cyclopentanone, cyclohexanone, cycloheptanone, and the like. Preferably, the carbonyl compound is an aldehyde, and, most preferably, benzaldehyde.

In carrying out the process of this invention to produce an α,β-unsaturated carboxylic acid, it is essential that strongly basic conditions be employed, conditions which produce sufficient alkalinity to achieve formation of a dianion of the α-phosphonoacetic acid starting material. The essential dianion has the structural formula

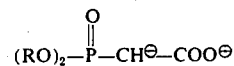

in which R is as aforedefined. Bases having sufficient alkalinity to cause formation of the dianion of the α-phosphonoacetic acid starting material include alkali metal hydrides, such as sodium hydride, potassium hydride, and lithium hydride; alkali metal tertiary alkoxides, such as sodium t-butoxide, sodium t-amyloxide, potassium t-butoxide, potassium t-amyloxide, lithium t-butoxide, lithium t-amyloxide, and the like; alkali metal amides, such as lithium diisopropylamide, lithium dicyclohexylamide, lithium di-t-butylamide, potassium diisopropylamide, potassium dicyclohexylamide, potassium di-t-butylamide, sodium diisopropylamide, and the like. Preferred bases include the alkali metal hydrides or the alkali metal amides. More preferably, lithium hydride or a lithium amide is employed, and most preferably, the base which is employed is lithium hydride or lithium diisopropylamide.

In carrying out the process of this invention, the dianion of the α-phosphonoacetic acid must first be generated. This is accomplished by treatment of the α-phosphonoacetic acid with the selected base. Generation of the dianion can be accomplished either in the presence of the aldehyde or ketone reactant or prior to addition of the latter to the reaction mixture containing the generated dianion. Upon generation of the dianion, the reaction thereof with the aldehyde or ketone proceeds once contact of the dianion with the aldehyde or ketone is established. Generation of the dianion typically is accomplished by treatment of the α-phosphonoacetic acid with the selected base in a suitable inert solvent under substantially anhydrous conditions. The selected base can be employed as such, or can be generated in situ. For example, lithium diisopropylamide can be generated in situ from methyllithium and diisopropylamine.

Any inert solvent can be employed. Suitable such solvents include, for example, ether solvents, such as tetrahydrofuran (THF), dimethoxyethane, dioxane, and the like.

The dianion is generated by mixing the selected α-phosphonoacetic acid with at least two equivalents of the base, one equivalent being required to generate each anion center. Generally, the dianion is generated at a temperature of from about −80° C. to about +25° C., with a temperature in the lower part of this range, for example, from about −80° C. to about −40° C. being preferred.

The dianion is generated quite rapidly. Preferably, it is formed in the absence of the selected aldehyde or ketone, and the aldehyde or ketone then is added to the mixture containing the formed dianion. The ketone or aldehyde is reacted with the dianion at a temperature generally within the range employed during formation of the dianion, that is, a temperature from about −80° C. to about +25° C. Reaction generally is complete within a period of from about 6 to about 60 hours. The reaction of the dianion of the α-phosphonoacetic acid with the aldehyde or ketone is on a 1:1 molar basis; therefore, approximately equivalent amounts of the reactants are employed. Since the α-phosphonoacetic acid reagent generally is the more expensive of the two reactants, it is preferred, if an excess of one of the reactants is employed at all, that an excess of the aldehyde or the ketone be employed. This then will tend to drive the reaction more nearly to completion with respect to the α-phosphonoacetic acid which is present. However, such an excess is not essential since the reaction proceeds on a 1:1 molar basis.

Isolation of the product can be accomplished by any of several techniques. Typically, however, the resulting reaction mixture is evaporated to a residue, and the residue is purified by a preparative thin-layer chromatography (TLC) technique.

Illustrative of the α,β-unsaturated carboxylic acids produced by the process of this invention are the following acrylic acid, crotonic acid, 2-pentenoic acid, 2-hexenoic acid, 2-heptenoic acid, 3-methyl-2-pentenoic acid, 3-methyl-2-hexenoic acid, 3-methyl-2-heptenoic acid, 3-ethyl-2-pentenoic acid, 3-ethyl-2-hexenoic acid, 3-ethyl-2-heptenoic acid, 3-propyl-2-pentenoic acid, 3-propyl-2-hexenoic acid, 3-propyl-2-heptenoic acid, 3-butyl-2-pentenoic acid, 3-butyl-2-hexenoic acid, 3-butyl-2-heptenoic acid, β-methylcrotonic acid, cinnamic acid, β-methylcimmamic acid, β-ethylcinnamic acid, β-propylcinnamic acid, β-butylcinnamic acid, β-phenylcinnamic acid, cyclopentylideneacetic acid, cyclohexylideneacetic acid, cycloheptylideneacetic acid, and the like.

The α,β-unsaturated carboxylic acids produced by the process of this invention have many and varied recognized uses. Specifically, however, they are useful as acylating agents in the preparation of active cephalosporin and penicillin antibiotics, such as are disclosed in U.S. Pat. Nos. 3,355,452; 3,453,272; 3,502,665; 3,665,993; 3,682,903; 3,708,480; 3,719,667; and 3,728,342. In accordance with known techniques, 7-acylamido cephalosporins and 6-acylamidopencillins in which the acyl function corresponds to the acyl group present in any of the α,β-unsaturated carboxylic acids produced by the process of this invention can be produced from reaction of an activated form of the α,β-unsaturated carboxylic acid with a 7-aminocephalosporin or a 6-aminopenicillin.

The following examples are provided in order to further illustrate this invention.

EXAMPLE 1 — α,(DIBENZYLPHOSPHONO)ACETIC ACID

To 13.2 g. of dibenzyl phosphite (50 mmole) in 150 ml. of tetrahydrofuran (THF) cooled to −80° C. were added 28.4 ml. of a 1.76 molar solution of methyllithium (50 mmole) in ethyl ether. After ten minutes, 6.10 g. (50 mmole) of methyl iodide were added by means of a syringe. The mixture was maintained in the cold for a few minutes after which it was allowed to warm to room temperature and was stirred at room temperature for about 3 hours. The solvents were removed, and 300 ml. of ethyl acetate were added to the residue. The ethyl acetate solution was washed with 100 ml. of water, dried over magnesium sulfate, and evaporated. Crude methyl dibenzyl phosphonate (9.4 g.) was obtained and was dried in vacuo.

The crude methyl dibenzyl phosphonate was placed in 125 ml. of THF, and the mixture was cooled to −80° C. To the mixture were added 28.4 ml. of a 1.76 molar solution of methyllithium (50 mmole) in ethyl ether. The mixture was stirred for about 10 minutes, and carbon dioxide was then bubbled into the mixture for 3 minutes by means of a syringe. After 20 minutes, the solvent was evaporated from the mixture, and 300 ml. of water were added to the residue. the aqueous The was washed four times with 100 ml. portions of ether. Ethyl acetate (200 ml.) was added, and the aqueous layer was then acidified to pH 2.5 by addition of concentrated hydrochloric acid. The ethyl acetate was separated from the acidified mixture, dried over magnesium sulfate, and evaporated to give 2.4 g. of α-(dibenzylphosphono)acetic acid, isolated as an oil. NMR (CDCl$_3$):—0.37 (s, CO$_2$H), 2.67 [s, (C$_6$H$_5$CH$_2$O)$_2$], 4.93 [d, J = 9 Hz, (C$_6$H$_5$CH$_2$O)$_2$], and 6.93

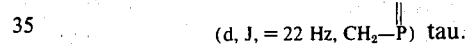

(d, J, = 22 Hz, CH$_2$—P) tau.

EXAMPLE 2 — CYCLOHEXYLIDENEACETIC ACID

To 202 mg. (2 mmole) of isopropylamine in 25 ml. of THF cooled to 0° C. were added 1.49 ml. of a 1.55 molar solution of methyllithium (2 mmole) in ethyl ether. After five minutes, the solution was cooled to −80° C, and 320 mg. (1 mmole) of α-(dibenzylphosphone)acetic acid in 4 ml. of THF were added. After 5 minutes, 98 mg. (1 mmole) of cyclohexanone in 3 ml. of THF were added. After addition, the reaction mixture was allowed to warm to room temperature and was stirred for 13 hours. The solvents were evaporated, and 20 ml. of aqueous 5 percent hydrochloric acid were added to the residue. The aqueous acid mixture was extracted with 100 ml. of ethyl acetate. The ethyl acetate extract was dried over magnesium sulfate and evaporated. The residue was chromatographed on silica gel thick layer plates using a 2:1 ether:petroleum ether solvent system to give 96 mg. of cyclohexylideneacetic acid (66 percent yield).

EXAMPLE 3 — TRANS-CINNAMIC ACID

To 404 mg. (4 mmole) of ispropylamine in 25 ml of THF cooled to 0° C. were added to 2.58 ml. of a 1.55 molar solution of methyllithium (4 mmole) in ethyl ether. After 5 minutes, the resulting solution was cooled to −80° C., and 640 mg. (2 mmole) of α-(dibenzylphosphono)acetic acid in 4 ml. of THF were added. After five minutes, 212 mg. (2 mmole) of benzaldehyde in 3 ml. of THF were added. After addition, the reaction mixture was allowed to warm to room temperature and was stirred for 48 hours. The solvents were evaporated, and 20 ml. of aqueous 5 percent hydrochloric acid were added. The aqueous acid mixture was extracted with 100 ml. of ethyl acetate. The ethyl acetate extract was dried over magnesium sulfate and evaporated. The residue was chromatographed on silica gel thin layer plates using a 2:1 mixture of ether and petroleum ether as solvent system. trans-Cinnamic acid (200 mg.), representing a 70 percent yield, was obtained.

EXAMPLE 4 — TRANS-CINNAMIC ACID

To a dried flask containing a nitrogen gas inlet, a serum cap, and a drying tube, were added at room temperature 25 ml. of tetrahydrofuran (THF) and 0.665 ml. of diisopropylamine, the latter being added by means of a syringe. The mixture was cooled to 0° C. Upon cooling, 1.52 ml. of a 1.76 molar solution of methyllithium in ethyl ether were added by means of a syringe, and, after a few seconds, the mixture was cooled to −80° C. in a dry ice-acetone bath. After 10 minutes, 396 mg. of the lithium salt of α-(dimethylphosphono)acetic acid were added as a solid. The solid was washed into the flask with 10 ml. of THF. The solution was allowed to stir for another 10 minutes; however, the lithium salt was not soluble in THF. Benzaldehyde (0.242 ml.) was added by means of a syringe, and the resulting mixture was stirred at −80° C. for 15 minutes. The resulting mixture was clear and yellow-green; however, the lithium salt still remained insoluble in the mixture. After a further 15 minutes at −80° C., the solution was allowed to warm to room temperature. After two hours at room temperature, the solution had become very murky and was pale yellow-green. A portion of the lithium salt remained undissolved; however, in addition to the insoluble lithium salt, a granular precipitate began to form. The mixture was stirred at room temperature overnight. After stirring for 23 hours, the mixture was bright yellow with a slight tinge of green and was very murky. The THF was evaporated from the mixture, and the residue was dissolved in ethyl acetate and water. The pH was adjusted to pH 10.2 to pH 2.5 by addition of concentrated hydrochloric acid. The aqueous acid layer was extracted with more ethyl acetate. The ethyl acetate fractions were combined and washed thoroughly with water, dried over anhydrous magnesium sulfate, and evaporated. The residue was dried in vacuo overnight to obtain 247 mg. of a bright yellow solid.

A portion of the product (220 mg.) was purified by preparative thin layer chromatography (TLC), run in a 4:1 mixture of ether and petroleum ether to obtain 51 mg. of a cinnamic acid (15% yield), the structure of which was established by comparison with an authentic sample.

I claim:
1. An α-phosphonoacetic acid of the formula

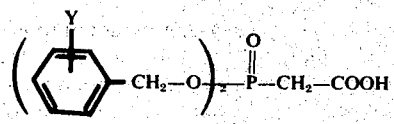

in which Y represents a substituent in the ortho- or paraposition and is selected from the group consisting of hydrogen, methyl, methoxy, halo, and nitro.

2. Compound of claim 1, in which Y is hydrogen.

* * * * *